No. 663,720. Patented Dec. 11, 1900.
G. T. BOUSLOG.
HOLDBACK AND SHORT HITCH.
(Application filed Apr. 9, 1900.)
(No Model.)
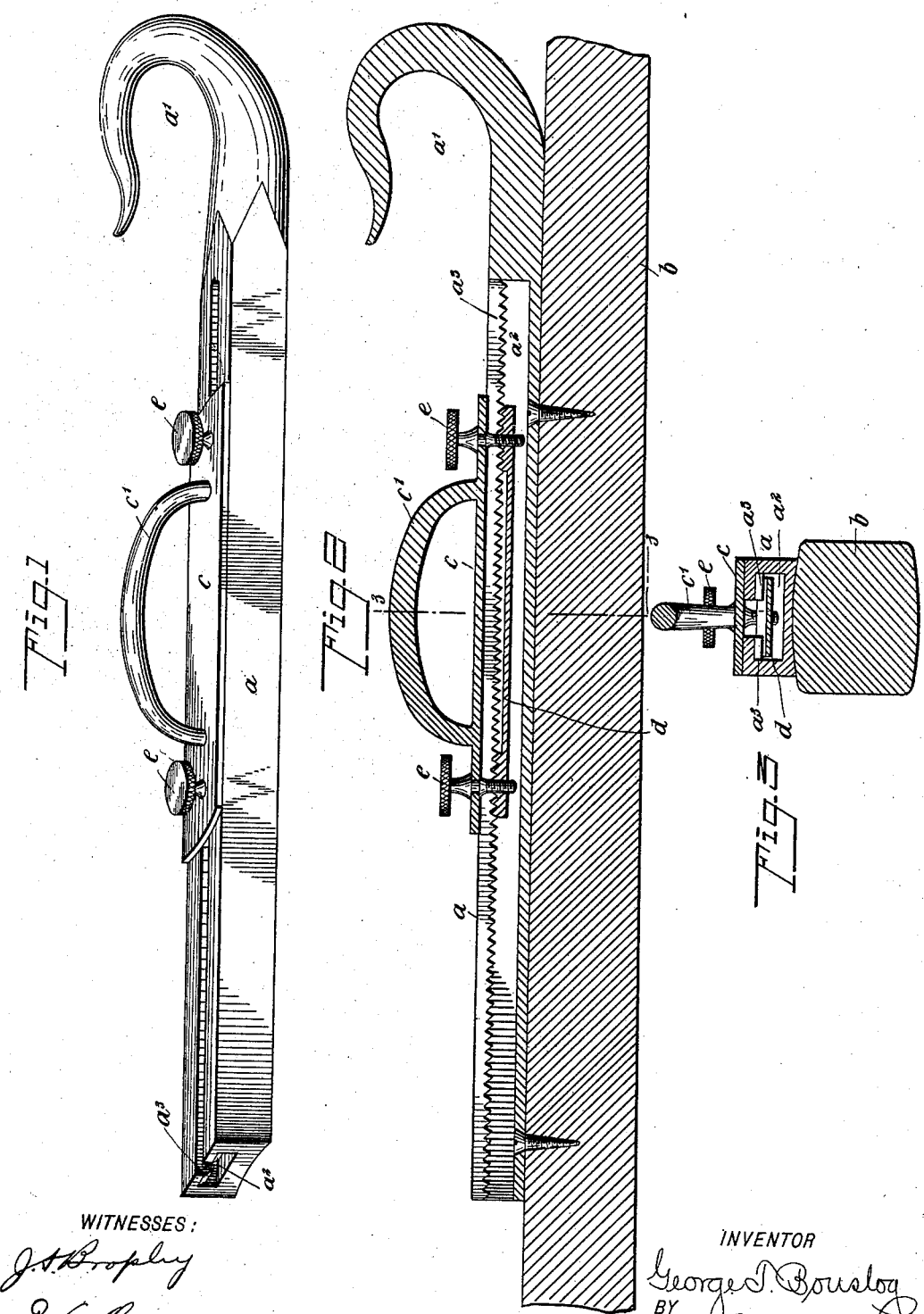
WITNESSES:
INVENTOR
George T. Bouslog
BY
ATTORNEYS

UNITED STATES PATENT OFFICE.

GEORGE T. BOUSLOG, OF WINAMAC, INDIANA.

HOLDBACK AND SHORT HITCH.

SPECIFICATION forming part of Letters Patent No. 663,720, dated December 11, 1900.

Application filed April 9, 1900. Serial No. 12,108. (No model.)

*To all whom it may concern:*

Be it known that I, GEORGE T. BOUSLOG, a citizen of the United States, and a resident of Winamac, in the county of Pulaski and State of Indiana, have invented a new and Improved Holdback and Short Hitch, of which the following is a full, clear, and exact description.

This invention relates to an attachment for vehicle-thills by which to facilitate the connection of the holdback-strap therewith; and it comprises certain novel constructions providing a durable and easily-operated device which may be adjusted at will to suit the conditions of its use.

This specification is the disclosure of one form of the invention, while the claims define the actual scope thereof.

Reference is to be had to the accompanying drawings, forming a part of this specification, in which similar characters of reference indicate corresponding parts in all the views.

Figure 1 is a perspective view of the device. Fig. 2 is a longitudinal section of the device applied to a thill, and Fig. 3 is a cross-section on the line 3 3 of Fig. 2.

The device comprises a bar $a$, which is fastened to the thill $b$ of a vehicle by screws or other devices, as shown, and which is provided at its front end with a hook $a'$, adapted to be connected with the tug-strap or traces of a harness, making a short hitch. The bar $a$ is formed with a longitudinally-disposed undercut $a^2$ therein, the under faces of the overhanging portions of which are formed with ratchet-teeth $a^3$. Slidable on the bar $a$ is a plate $c$, provided with a bail $c'$, with which the holdback may be connected. The plate $c$ is held at the desired adjustment by means of a toothed keeper-plate $d$, which is fitted to slide in the groove $a^2$ of the bar $a$ and adapted to be locked in engagement with the ratchet-teeth $a^3$, as shown. The keeper $d$ is connected with the plate $c$ by means of thumb-screws $e$, which are mounted to turn in the plate $c$, respectively at the ends thereof, and which are threaded into the ends of the keeper $d$. By manipulating these screws the keeper may be engaged or disengaged with and from the teeth $a^3$, and thus the plate $c$ may be rendered movable or fast, as desired. By this arrangement the plate $c$ may be readily adjusted to any convenient position and held securely in the same.

Having thus described my invention, I claim as new and desire to secure by Letters Patent—

1. The combination of a bar or body portion with an undercut groove therein, the inner walls of the overhanging portions of said groove having ratchet-teeth thereon, a ratcheted keeper mounted to slide in the groove and having teeth engaging the teeth of the bar, a holdback mounted on the bar or body, and means connecting the keeper with the holdback, such means serving to engage the keeper with the ratcheted walls of the groove in the bar or body, to adjustably secure the holdback-plate.

2. The combination of a bar or body with an undercut groove therein, a keeper slidably mounted in the groove, a holdback mounted on the bar or body adjacent to the groove, and means extending between the holdback and the keeper to engage the holdback with the inner walls of the undercut groove, whereby adjustably to fasten the holdback on the bar or body.

In testimony whereof I have signed my name to this specification in the presence of two subscribing witnesses.

GEORGE T. BOUSLOG.

Witnesses:
FRANK P. WADE,
MAE CASPER.